(12) United States Patent
Jenkins (10) Patent No.: US 6,937,108 B2
(45) Date of Patent: Aug. 30, 2005

(54) METHODS AND APPARATUS FOR OFFSET CHIRP MODULATION

(75) Inventor: Alan Jenkins, Groton, MA (US)

(73) Assignee: M/A-Com, Inc., Lowell, MA (US)

( * ) Notice: Subject to any disclaimer, the term of this patent is extended or adjusted under 35 U.S.C. 154(b) by 178 days.

(21) Appl. No.: 10/385,812

(22) Filed: Mar. 11, 2003

(65) Prior Publication Data
US 2005/0058218 A1 Mar. 17, 2005

(51) Int. Cl.[7] .................................................. H03C 1/00
(52) U.S. Cl. ....................... 332/149; 332/157; 332/151; 375/300
(58) Field of Search ................................ 332/149, 157, 332/151; 375/300

(56) References Cited

U.S. PATENT DOCUMENTS 5,113,278 A * 5/1992 Degura et al. ............... 398/199

2002/0057726 A1 * 5/2002 Williams et al. ............ 375/136

* cited by examiner

Primary Examiner—Michael B Shingleton (57) ABSTRACT

A method and apparatus for producing a modulation scheme usable in conjunction with information transmission and reception via waveforms, such as electromagnetic waves. The modulation scheme is usable for such purposes as resolving range ambiguities and overcoming fading and interference problems via use of offset signals that vary in frequency over time (e.g., chirp signals), which spread the signal over a larger bandwidth. The method includes coding a symbol signal onto a split data stream containing a reference signal (e.g., a chirp), to which a time delay has been applied, then recombining the split streams to produce a composite waveform. The method can also include demodulating a composite received waveform by applying a reference signal to the waveform and then band pass filtering the waveform into discrete symbol data. Apparatus and systems are also provided for performing the method.

41 Claims, 13 Drawing Sheets

METHODS AND APPARATUS FOR OFFSET CHIRP MODULATION

FIELD OF THE INVENTION

This invention relates to methods and apparatus for transmitting and receiving information via modulation of a radio frequency (RF) carrier, and in particular to transmitting and receiving waveforms for communications applications using offset chirp modulation.

BACKGROUND OF THE INVENTION

Electromagnetic and other waves may be used to transmit and receive information through modulated waveforms. For example, radar may use transmitted and reflected modulated waveforms to determine an object's location. Cellular telephones and digital television broadcasts all use complex modulation schemes (such as Gaussian minimum shift keying (GMSK) and orthoganol frequency division multiplexing (OFDM), respectively) to reliably transmit information in a variety of forms (e.g., voice, pictures, video and digital data). Reliable information transmission, for example with an acceptable bit error rate in the context of digital signals, may be difficult to achieve, however, because of many problems, including narrow band and multipath fading, narrow band interference, etc.

Information transmission is often segmented into physical frequency channels. Certain characteristics may be discrete to a given channel, and these channel characteristics primarily determine the rate at which data can be transmitted and the power required to maintain a certain fidelity (e.g., bit error rate) of the communication. Thus, a modulation scheme may be fine tuned to a particular channel, and so more efficiently transmit information within that channel. Again, however, fading and interference may occur within a channel and it is the characteristics and the behavior of the modulation scheme under differing channel characteristics that determine how effective a modulation scheme is.

Thus, there remains a need for methods and apparatus for transmitting and receiving information via modulated waveforms that minimize fading and interference problems.

In addition, certain military applications exist where covert transmission and a transmitted waveform that is both difficult to detect and decode/demodulate are an advantage, and for which an unmet need remains.

SUMMARY OF THE INVENTION

It is an advantage of the invention to meet these needs, as well as others, by providing methods and apparatus for producing modulation schemes usable for such purposes as resolving range ambiguities and overcoming fading and interference problems. In the preferred embodiments, offset signals are used that vary in frequency over time (referred to herein as chirp signals), thus spreading the signal over a larger bandwidth. A modulation scheme so produced is usable in conjunction with information transmission and reception via modulated waveforms, such as frequency modulated (FM) electromagnetic waves, and for such uses as determining positions of objects and transmission of data between radio or television equipment.

The modulation scheme of the preferred embodiments may be constructed via split input data streams containing a reference signal (e.g., a chirp), to each of which a varying time delay and coded symbol bit has been applied, to produce a composite waveform. In one embodiment, a received composite waveform may also be demodulated by applying a reference signal to the waveform and then band pass filtering the waveform into discrete symbol data.

Preferred apparatus embodiments include: a modulator for applying the time delay to each split portion of the input data stream for recombination and use, for example, for transmission as a composite waveform; and, a demodulator for receiving a composite waveform, applying a reference signal to the waveform, and band pass filtering the waveform into discrete data.

In one embodiment, multiple, low bit rate sub-channels are achieved at a modulator by transmitting multiple reference signals (e.g., chirps or other sub-carriers) that are time offset and to which symbol data have been applied. In a demodulator, these time offsets are transformed into frequency offsets by multiplication (e.g., mixing of the received composite signal with a single chirp). The transmission signal is produced by modulating the sub-carriers at a symbol rate, which, for example, may be related to the reference signal rate. In one embodiment, for example, amplitude shift keying (ASK) sub-carrier modulation is used at a rate equal to the reference signal (e.g., chirp) rate. In another embodiment, ASK sub-carrier modulation is used at a rate differing from the reference signal rate.

Additional advantages and novel features of the invention will be set forth in part in the description that follows, and in part will become more apparent to those skilled in the art upon examination of the following or upon learning by practice of the invention.

DETAILED DESCRIPTION OF THE INVENTION

The present invention comprises methods and systems for providing modulation schemes, and in particular modulation schemes that include what is referred to herein as offset chirp modulation (OCM).

Figure 1:
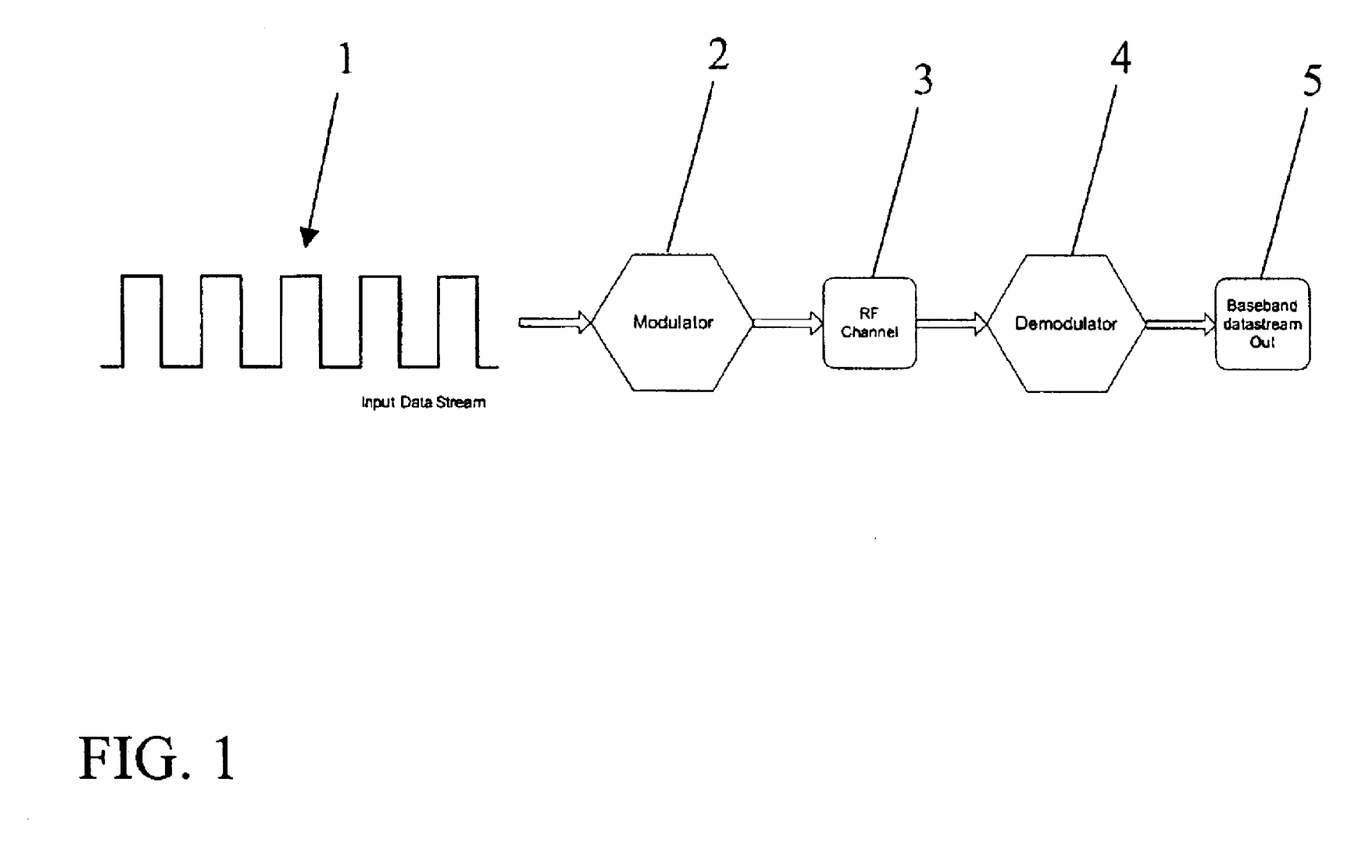
FIG. 1 presents a representative block diagram of various features for one example of a modulation scheme, in accordance with an embodiment of the present invention.

For the modulation scheme in accordance with one embodiment of the present invention, an input data stream, a modulator, a physical channel or transmission medium, and a demodulator are used. FIG. 1 presents a representative block diagram of various features for one example of a modulation scheme, in accordance with an embodiment of the present invention. These features include an input data stream 1, which is passed in turn to a modulator 2, which produces a transmission 3, such as a radio frequency (RF) transmission in a particular channel, a demodulator 4, and a baseband datastream output 5, such as data corresponding to received wave information.

Figure 2:
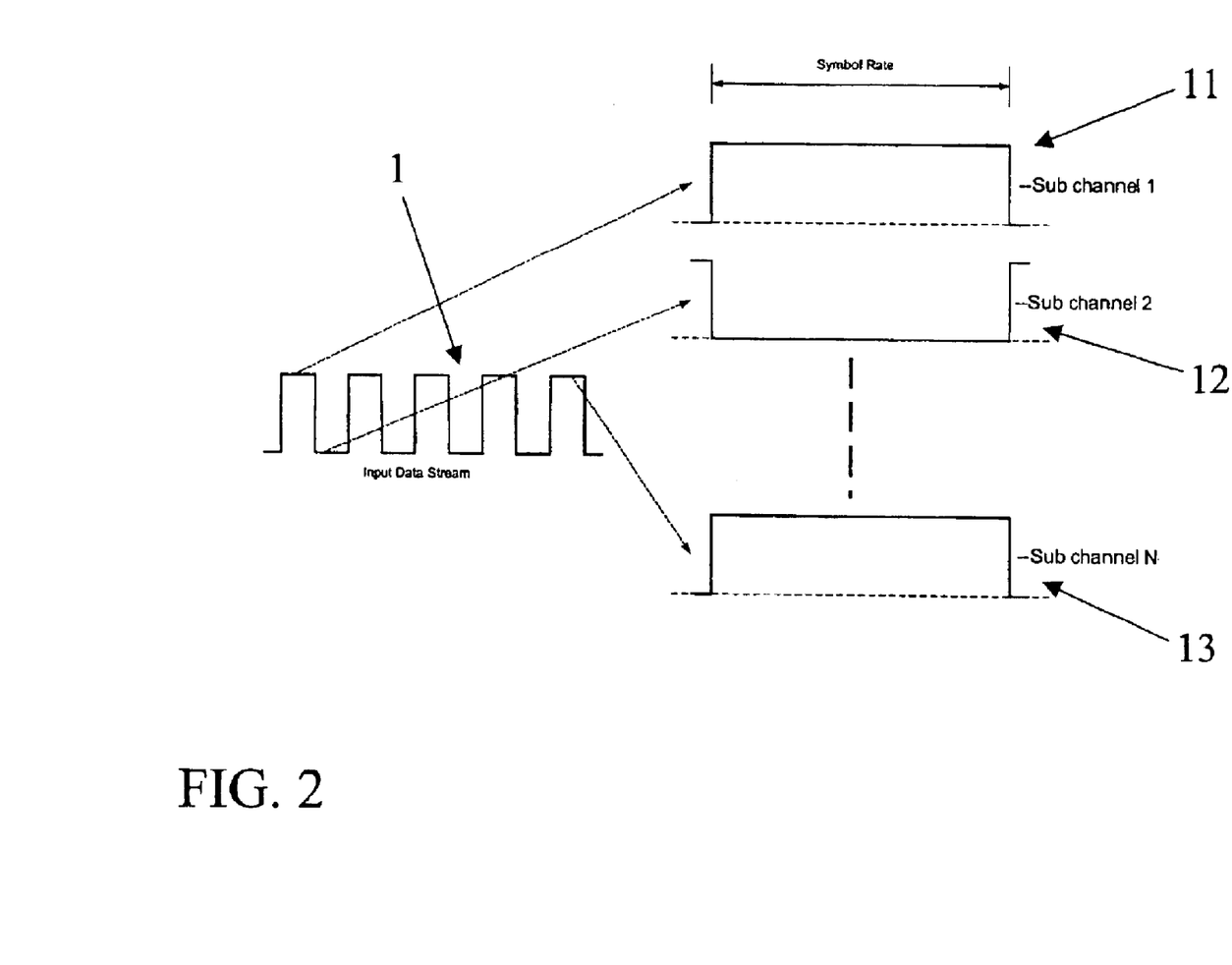
FIG. 2 contains a representative block diagram of an input stream multiplexed into N sub-channels, in accordance with an embodiment of the present invention.

In one embodiment of the present invention, in operation, first a high data rate input stream (e.g., IP bits/s) is multiplexed into N sub-channels (e.g., each with a new data rate of IP/N). FIG. 2 contains a representative block diagram of an input stream 1 multiplexed into N sub-channels 11, 12, 13 (in this example in which N=3), in accordance with an embodiment of the present invention. As a result of this multiplexing, the bit rate is much lower in each sub-channel than in the original input data stream.

Figure 3:
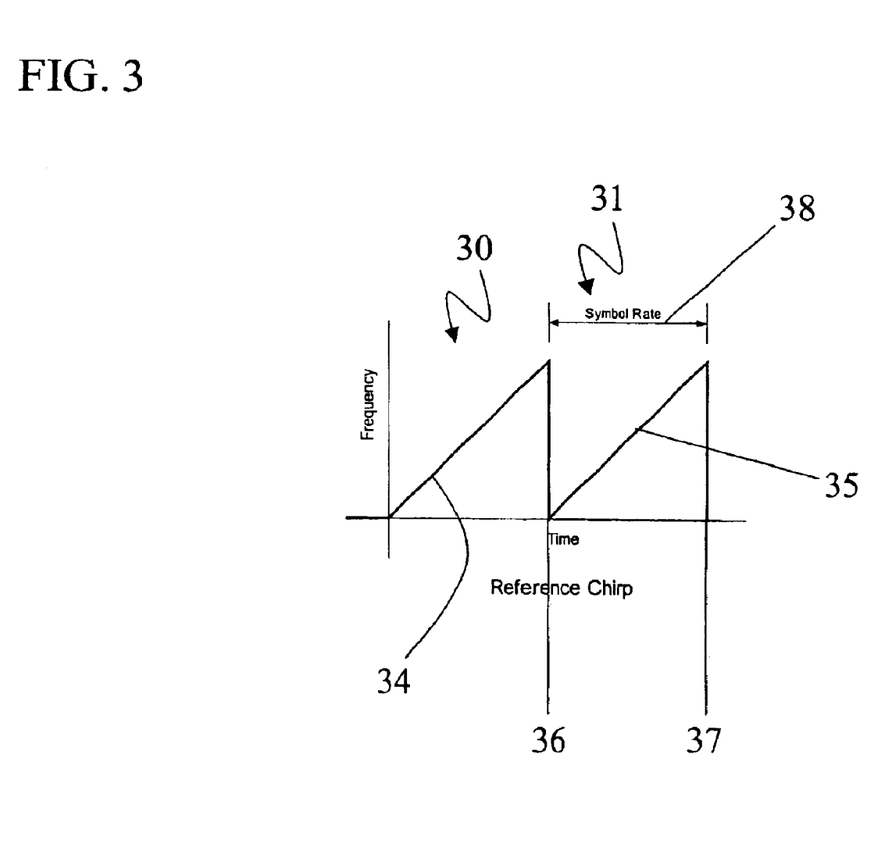
FIG. 3 shows a graphical representation of two symbol periods of an example chirp, in accordance with an embodiment of the present invention.

In parallel with the input of the data stream and the multiplexing of that stream, a frequency domain reference signal, such as a primary chirp "carrier," is generated. FIG. 3 shows a graphical representation of two symbol periods 30, 31 of an example reference signal, in accordance with an embodiment of the present invention. As shown in the example of FIG. 3, frequency ramps 34, 35 are generated. For example, frequency ramp 35 is produced between a start frequency ($f_{start}$) 36 and a stop frequency ($f_{stop}$) 37, and the change in frequency ($f_{start-fstop}\Delta f$) is periodic at a rate referred to in this example as the "chirp rate." In the example shown in FIG. 3, the symbol rate 38 is approximately equal to the chirp rate.

Other "chirp" waveforms are also possible. For example, non-linear in chirps which the frequency is not proportional to time, and waveforms in which the amplitude of the "chirp" may also vary in some pre-determined manner as a function of time (e.g., applying a time domain window function to the "chirp" waveform) may be used.

Figure 4:
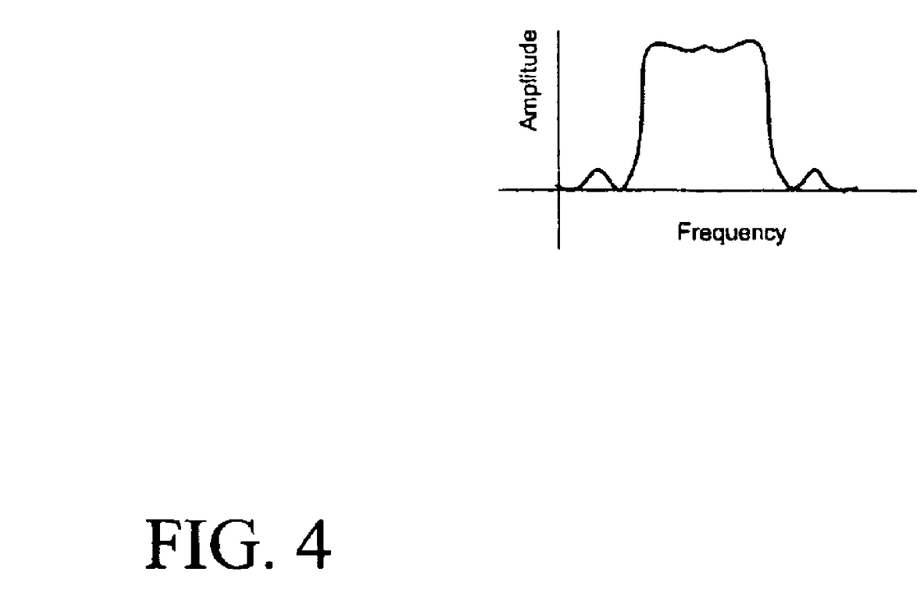
FIG. 4 is a graphical representation of frequency response for the reference signal of FIG. 3, in accordance with an embodiment of the present invention.

FIG. 4 is a graphical representation of the frequency response for the reference signal of FIG. 3, in accordance with an embodiment of the present invention.

Figure 5:
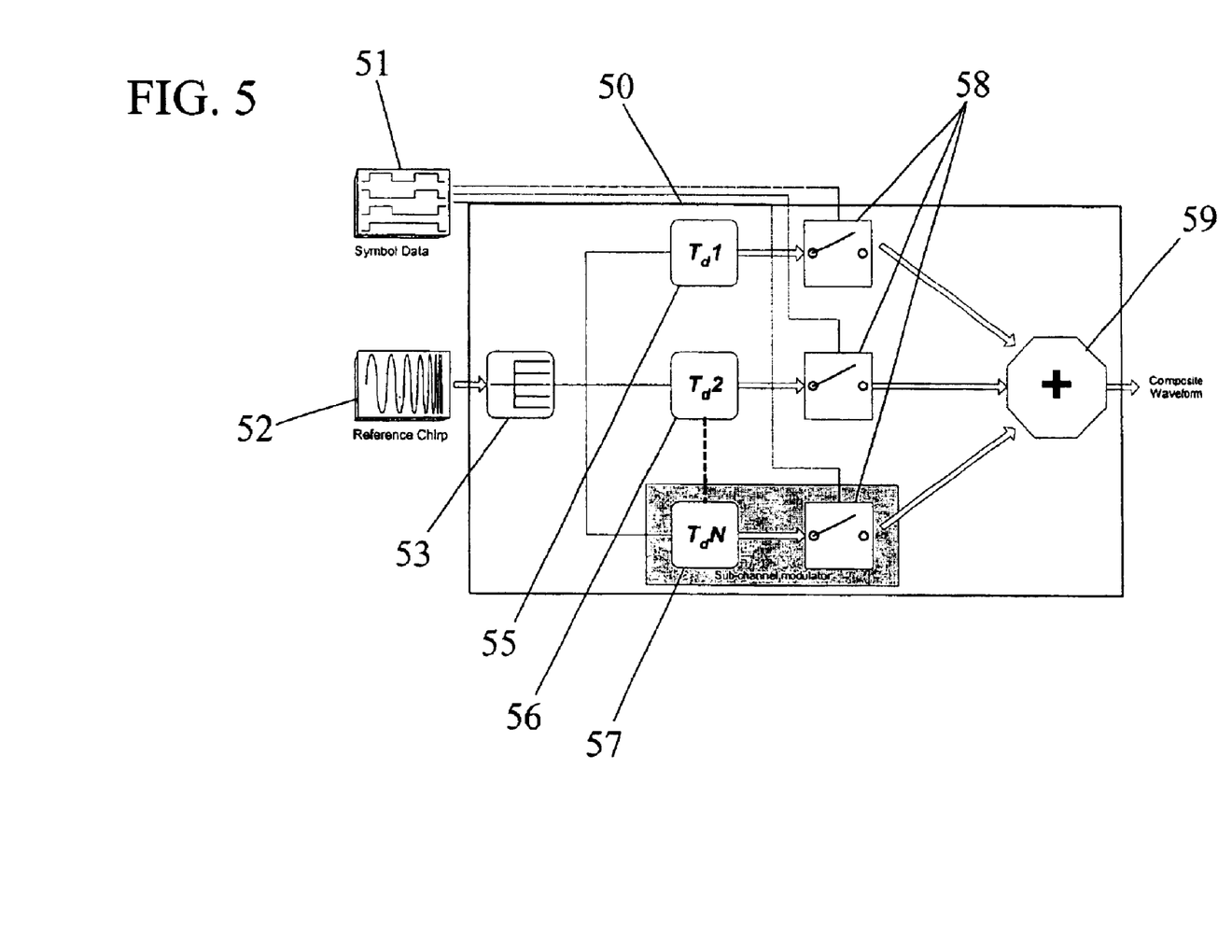
FIG. 5 presents a representative block diagram of an example offset chirp modulation (OCM) modulator, in accordance with an embodiment of the present invention.

FIG. 5 presents a representative block diagram of an example OCM modulator, in accordance with an embodiment of the present invention. The modulator 50 of the embodiment of FIG. 5 receives the two inputs 51, 52 generated as discussed above (e.g., input 51 is parallel sub-channel formatted data, such as is shown in FIG. 2, and input 52 is the reference signal, such as the chirp shown in FIG. 3, which is analogous to a carrier frequency). As with the input data stream 51, the reference signal input 52 is split into N sub-channels 53 of data. A different time delay 55, 56, 57 is introduced on each sub-carrier. In an embodiment of the present invention, the amount of time delay determines the frequency separation of the channels at the demodulator.

Each delayed sub-carrier then has the symbol bits coded upon it. In the example shown in FIG. 5, one symbol bit per sub-carrier is coded on each delayed sub-carrier using ASK (e.g., simple on-off keying), denoted by the switches 58 shown. The sub-carriers thus become sub-channels, and the sub-channels are summed into a composite waveform via a summing apparatus 59. While the examples shown in FIGS. 1–5 are for digital type data formats, the modulation scheme of the present invention is likewise applicable to analog sub-carrier modulation. In addition, OCM can also be provided with OCM sub-carrier modulation, if appropriate for a particular application.

In one embodiment of the present invention, error correction or other advantages may be obtained by further appropriately coding each sub-channel. For example, each sub-channel may be coded with Reed-Solomon codes for use for error correction. Further, the symbol pattern on each sub-channel may be selected so as to influence the envelope characteristics of the composite transmit spectrum in an appropriate manner for a particular application. For example, the symbol pattern may be selected so as to minimize the peak average ratio on the transmitted waveform, such that the linearity requirements on a power amplifier (PA) used in an apparatus to produce the scheme are minimized.

In addition, other techniques typically used in conventional chirp radar applications, such as pulse shaping, may be directly applied to OCM, in accordance with the present invention.

Figure 6:
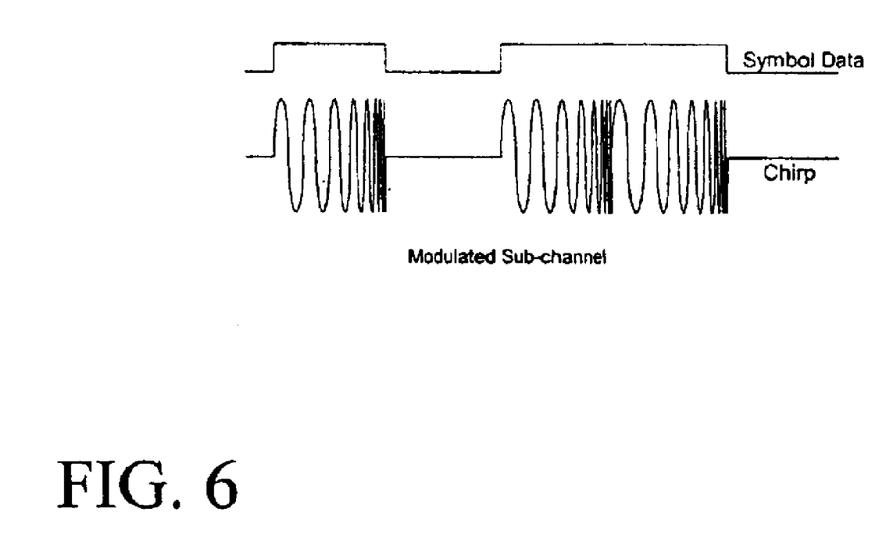
FIG. 6 is a graphical representation of the time output of a sub-channel, in accordance with an embodiment of the present invention.

In accordance with use of the apparatus of the embodiment shown in FIG. 5, the resulting composite signal is relatively complex, including N overlaid, delayed modulated reference signals (e.g., chirps). FIG. 6 is a graphical representation of the time output of a sub-channel, in accordance with an embodiment of the present invention. In the example of FIG. 6, ASK has been used to produce the output. However, other apparatus and methods known in the art may be used to generate the output.

Figure 7:
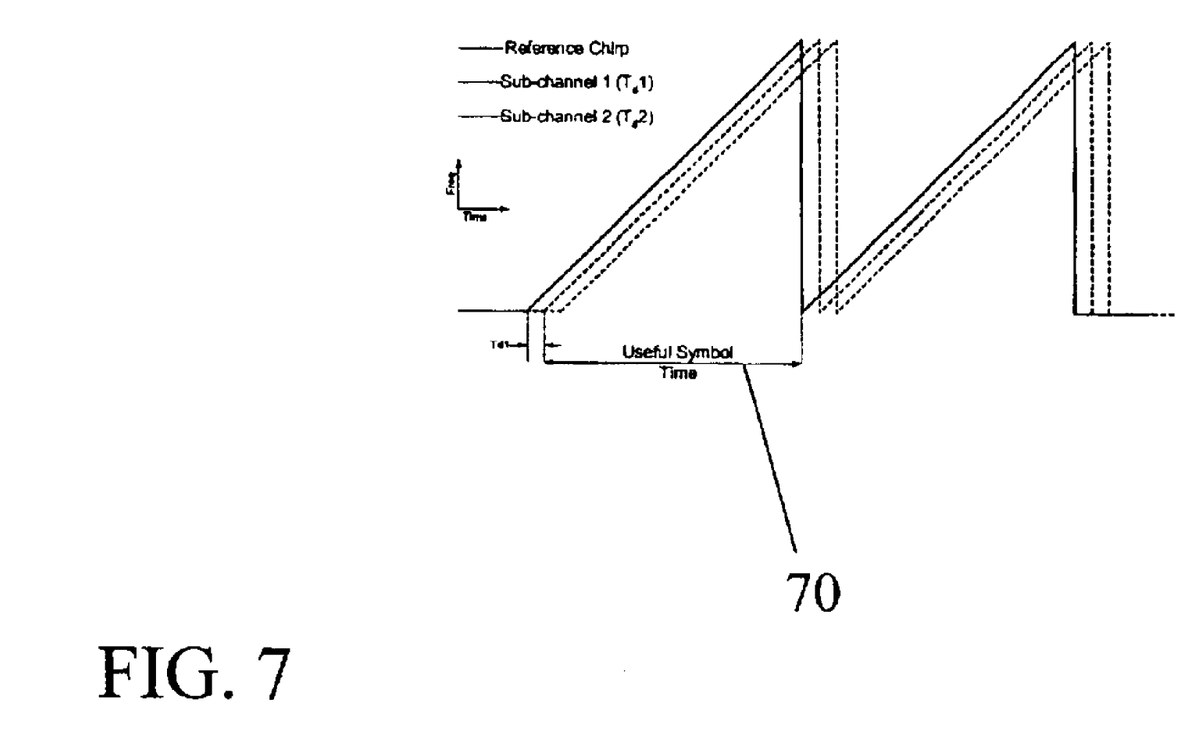
FIG. 7 shows a combined output that includes a series of chirps, all offset in time, following multiplexing together of multiple sub-channels, in accordance with an embodiment of the present invention.

As further shown in FIG. 7, once the multiple sub-channels are multiplexed together, the resulting combined output (e.g., signal to be transmitted by a transmitter) includes a series of reference signals (e.g., chirps), all offset in time. In the example of FIG. 7, the effective symbol period 70 is restricted to less than the chirp rate used, to a period bounded by the overlap of the first and last chirps. A tradeoff thus exists among number of sub-channels, capacity, and symbol rate.

In accordance with one embodiment of the present invention, the OCM demodulator may take various forms, depending on output needed. Generally, the process used by the demodulator includes multiplication (or mixing) in the frequency domain of a received composite waveform with an unmodulated reference signal (e.g., chirp). On one embodiment, the unmodulated reference signal has the same signal rate as the reference signal generated by the transmitter. The time delay between the reference signal ($R_x$) and the received signal determines the output sub-channel frequencies. In one embodiment, this process takes place directly at the RF transmit frequency using an RF chirp, at intermediate frequency (IF), or digitally, after undergoing an analog to digital conversion (ADC) within digital signal processing/field programmable gate arrays (DSP/FPGA) hardware, or some other suitable signal processing apparatus, as known in the art.

Figure 8:
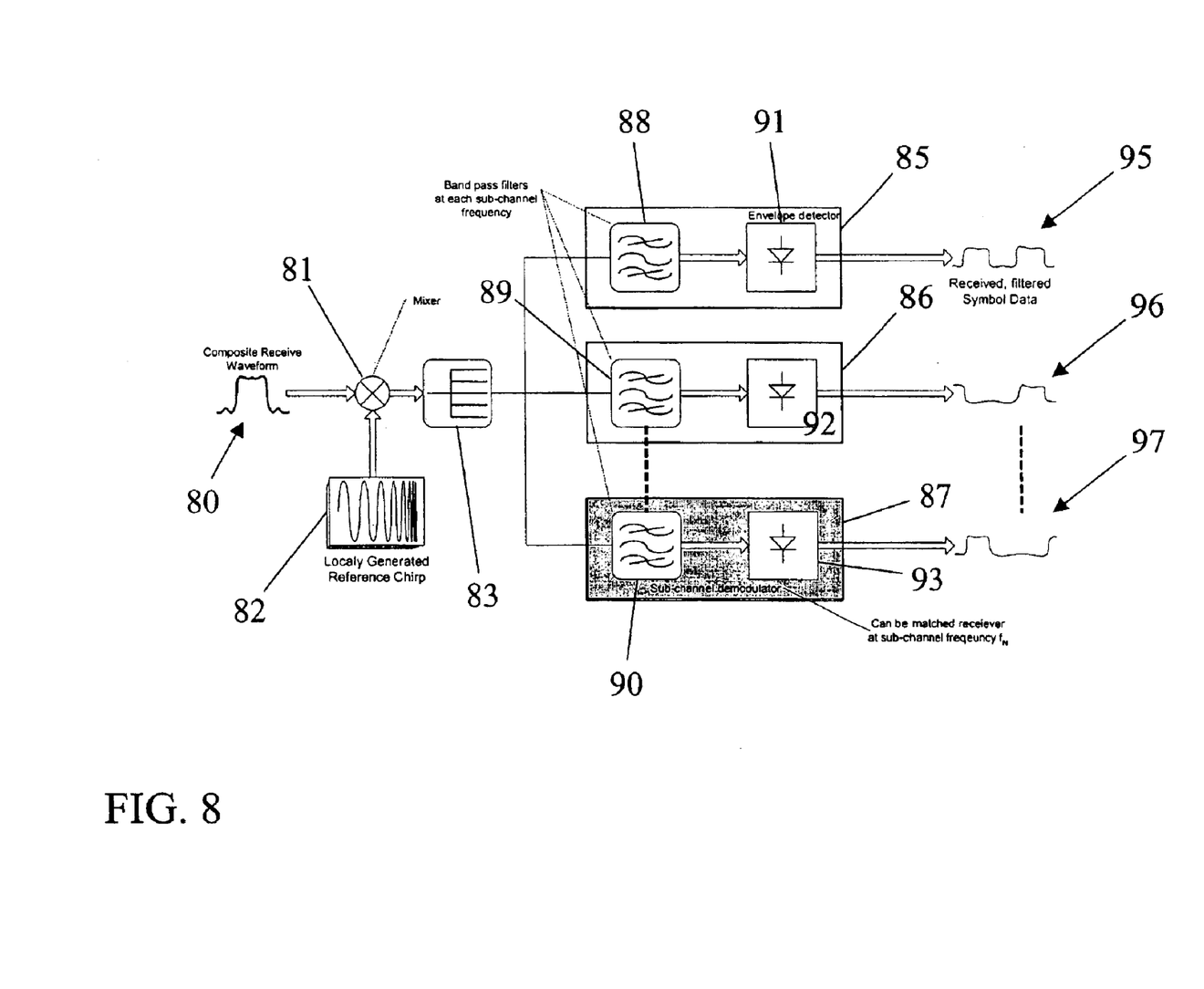
FIG. 8 presents a block diagram of one example apparatus for implementing a demodulator, in accordance with embodiments of the present invention.

Using the example of use of ASK, FIG. 8 presents a block diagram of one sample apparatus for implementing a demodulator, in accordance with an embodiment of the present invention. As shown in FIG. 8, the example composite received waveform 80 includes N multiple chirps, offset in time. At a mixer 81, the multiplication in the frequency domain by a reference chirp 82 transforms the time offset of the waveform into a frequency offset waveform, which is then split 83. This transformation reduces the problem of extraction of each sub-channel to a very simple filtering problem, in which, as with all communications systems, synchronization is an issue. In order to solve the filtering problem, the time offset of the locally generated reference chirp 82 must be set such that it transforms the various channels into each frequency "bin."

In the embodiment shown in FIG. 8, the split frequency offset waveform is passed in parallel to a series of sub-channel demodulators 85, 86, 87, each of which includes a band pass filter 88, 89, 90, respectively, the band pass filters 88, 89, 90 each filtering at a different sub-channel frequency. The output of each of the band pass filters 88, 89, 90 within each sub-channel demodulator 85, 86, 87, respectively, is then passed to an envelope detector 91, 92, 93, respectively. The resulting output of each sub-channel demodulator 85, 86, 87 is received as filtered symbol data 95, 96, 97, respectively.

Note that, in contrast to coded orthogonal frequency division multiplexing (COFDM), in which a fast fourier transform (FFT) is performed in order to focus on the individual carriers, with embodiments of the present invention, simple multiplication by a frequency ramp may accomplish the same result. Thus, in one sense, such embodiments of the present invention are more computationally efficient that COFDM.

Additional advantages of the use of OCM, in accordance with embodiments of the present invention, include high tolerance to narrow band and multipath fading, as well as good immunity to narrow band interference. For example, embodiments of the present invention may provide good immunity to narrow band interference because OCM is a form of spread spectrum modulation.

High tolerance to narrow band and multipath fading occurs at least in part because the sub-channel symbol rate is very slow. Thus, the statistical probability of inter-symbol interference caused by multipath propagation delay is very small. A high bit rate is nevertheless able to be achieved with a slow sub-channel symbol rate via use of multiple sub-channels.

Via transmission of the same information content on each of the channels, embodiments thus effectively provide another variation of spread spectrum. For example, at the demodulator, a mixing can be performed with a comb of offset unmodulated reference signals (e.g., chirps), with the parallel channels, then folded down into a single channel. The processing gain in this example would thus be a function of the number of parallel channels.

Figure 9:
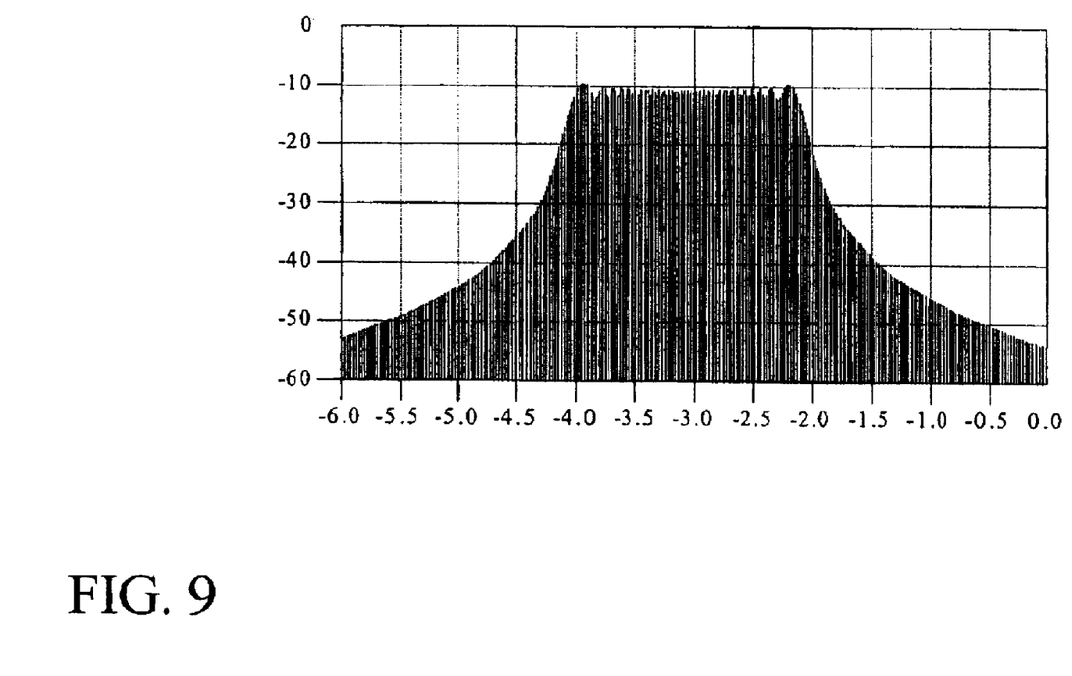
FIGS. 9–15 show various graphical results and other features in accordance with sample simulation results produced in accordance with embodiments of the present invention.

FIGS. 9–15 show various graphical results and other features in accordance with sample simulation results produced in accordance with embodiments of the present invention. As shown in FIG. 9, a simple realization of OCM was implemented in an Advanced Design System (ADS) system simulator, a simulator produced by Agilent Technologies of Palo Alto, Calif. In FIG. 9, simulation results are shown for a simple four sub-channel system that uses ASK sub-carrier modulation, simple raised cosine symbol filtering, and envelope detection at an OCM demodulator. In the example of FIG. 9, symbol period is 64 $\mu$S, which is equivalent to the chirp rate used in this example. Sub-channel spacing is 32 kHz (after being decompressed). Different data symbols are coded onto each channel by way of demonstration.

Also, in the example of FIG. 9, channel 1 contains a repetition of 16 ones and 16 zeros, channel 2 includes alternate ones and zeros at the symbol rate, channel 3 includes a continuous one, and channel 4 contains pseudo random bit sequences (PRBS) at the symbol rate. The frequency plot of the reference chirp is shown in FIG. 9. The starting frequency ($f_{start}$) and the stopping frequency ($f_{stop}$) are 2.048 MHz and 4.096 MHz, respectively. The chirp rate is $\Delta f/128$. The carrier frequency is 2 GHz.

Figure 10:
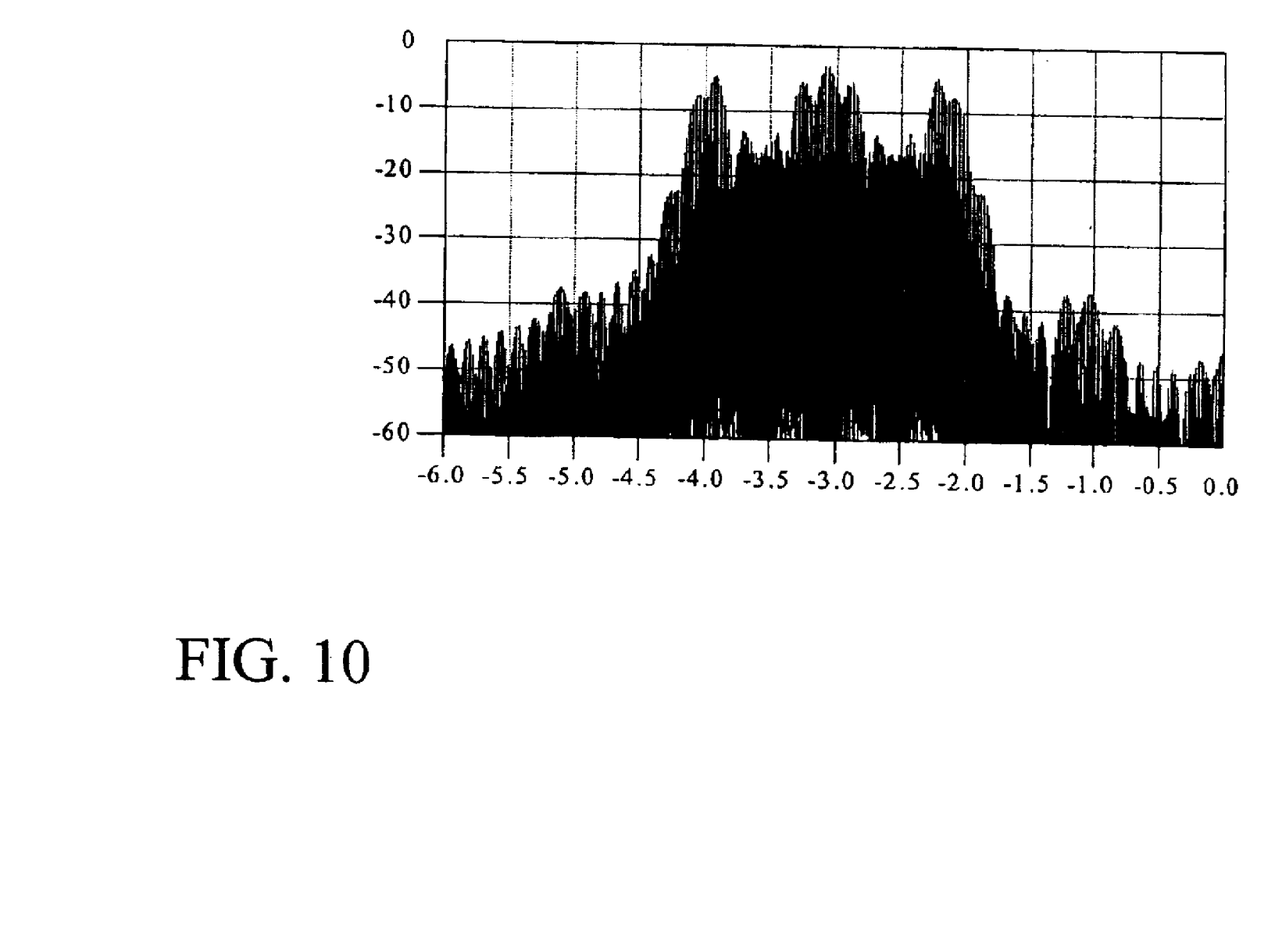

FIG. 10 shows the modulated transmit spectrum for the example simulation of FIG. 9. In FIG. 9, the simulation was run for 128 symbols. As shown, the spectral shape is a function of the number of symbols and also the form of the data on each channel. If all data is pseudo random and the simulation is run for a large number of symbols and a larger number of sub-carriers, the spectral shape appears flatter and more like the original reference signal.

Figure 11:
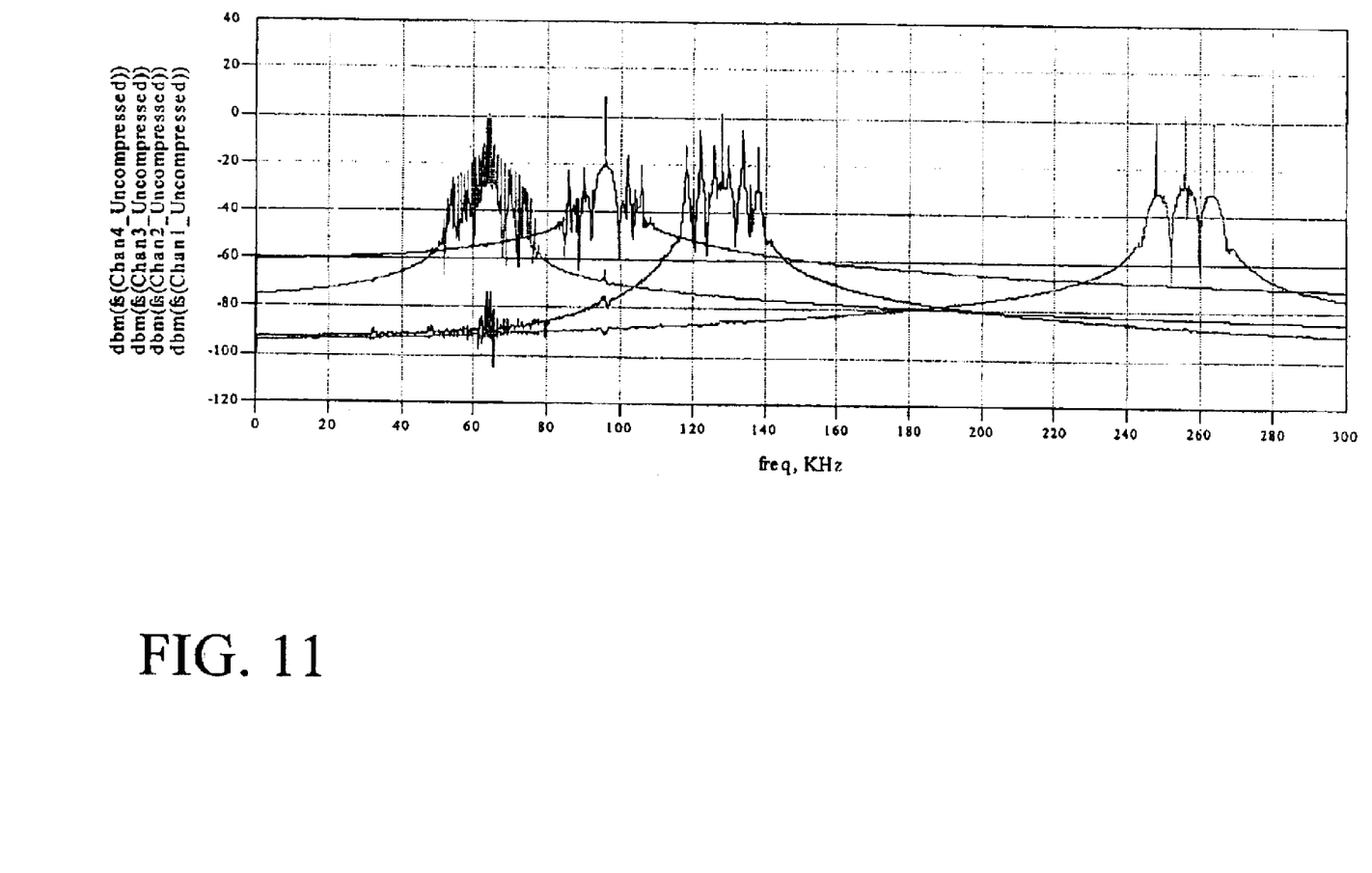
Figure 12:
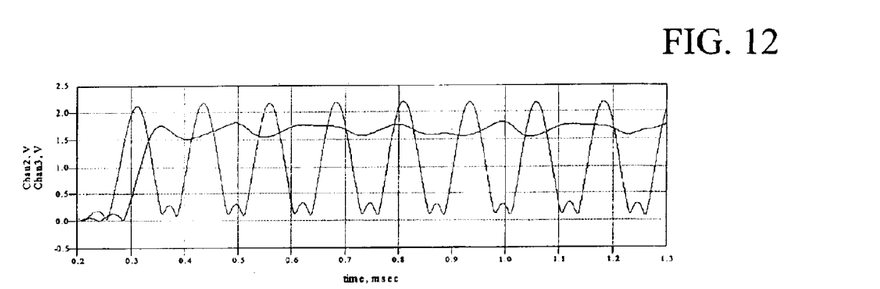
Figure 13:
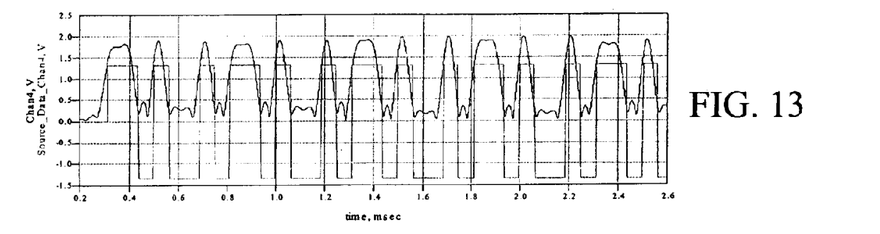
Figure 14:
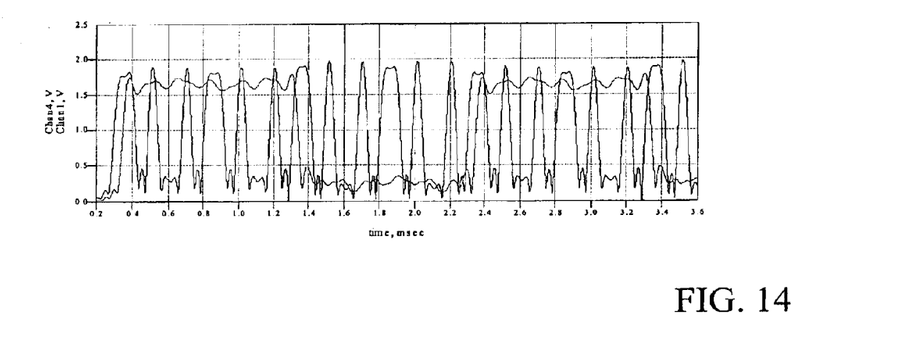
Figure 15:
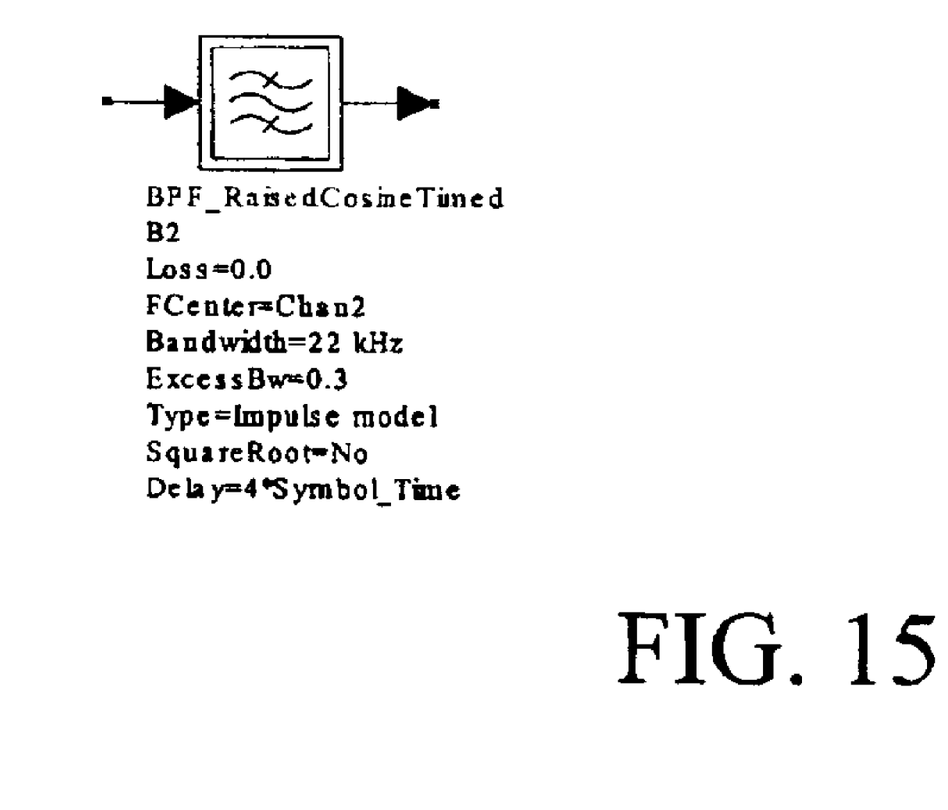

FIG. 11 shows the output of the demodulator in the frequency domain for the simulation of FIG. 9. Each sub-channel has been filtered using a raised cosine filter. FIGS. 12–14 present graphical representations of time domain plots showing the recovered data. In FIG. 13, channel 4 is shown with the source PRBS data for reference. A simple envelope detector, such as is representatively shown in FIG. 15, is used on each sub-channel after filtering.

Example embodiments of the present invention have now been described in accordance with the above advantages. It will be appreciated that these examples are merely illustrative of the invention. Many variations and modifications will be apparent to those skilled in the art.

What is claimed is:

1. A method for using a modulation scheme for communication, the method comprising:
    passing a reference chirp signal to a plurality of channels to produce a plurality of sub-carriers;
    applying a varying time delay to each of the plurality of sub-carriers;
    coding a symbol signal onto each of the plurality of sub-carriers; and
    combining the plurality of sub-carriers to produce a composite waveform.

2. The method of claim 1, wherein the symbol signal varies for each of the plurality of subcarriers.

3. The method of claim 1, wherein passing the reference signal to the plurality of channels to produce the plurality of sub-carriers includes:
    splitting the reference signal into a plurality of signals.

4. The method of claim 1, further comprising:
    transmitting the composite waveform; and
    receiving a received composite waveform.

5. The method of claim 4, further comprising:
    demodulating the received composite waveform into filtered symbol data.

6. The method of claim 5, wherein demodulating the received composite waveform into filtered symbol data further comprises:
    applying a second reference chirp signal to the received composite waveform.

7. The method of claim 6, wherein the reference chirp signal has a reference signal chirp rate, and wherein the second reference chirp signal has the reference signal chirp rate.

8. The method of claim 6, wherein the received composite waveform is received at a receiving location, and wherein the second reference chirp signal is generated at the receiving location.

9. The method of claim 6, wherein applying the second reference chirp signal to the received composite waveform produces a plurality of frequency offset waveforms.

10. The method of claim 9, further comprising:
    passing the plurality of frequency offset waveforms to a plurality of sub-channel demodulators.

11. The method of claim 10, wherein each of the plurality of sub-channel demodulators produces filtered symbol data.

12. The method of claim 10, wherein each of the plurality of sub-channel demodulators includes a band-pass filter, such that the plurality of sub-channel demodulators includes a plurality of band-pass filters.

13. The method of claim 12, wherein each of the band pass filters has a corresponding filtering band frequency, the filtering band frequency for each, of the bandpass filters differing, such that each of the plurality of sub-channel demodulators produces filtered data for the corresponding filtering band frequency.

14. The method of claim 10, wherein each of the plurality of sub-channel demodulators includes an envelope detector.

15. The method of claim 1, wherein the waveform is an electromagnetic wave.

16. The method of claim 1, wherein passing the reference chirp signal to the plurality of channels to produce the plurality of sub-carriers includes:

splitting the reference chirp signal into a plurality of reference chirp signals, wherein each of the plurality of reference chirp signals is transmitted to one from the plurality of channels.

17. The method of claim 1, wherein the symbol signal comprises symbol data.

18. The method of claim 1, wherein the symbol signal is generated by amplitude shift keying (ASK).

19. The method of claim 1, wherein the symbol signal is generated by on-off keying.

20. The method of claim 1, wherein the symbol signal is generated via a switch.

21. An offset chirp modulation transmission and receiving apparatus, comprising:

a modulator producing a transmitted complex composite waveform output via a plurality of data inputs, the modulator including a plurality of sub-channel modulators for receiving a plurality of split data inputs from at least one of the plurality of data inputs; and a demodulator for receiving a complex composite waveform input, the demodulator including a plurality of sub-channel demodulators for producing a plurality of filtered symbol data.

22. The apparatus of claim 21, wherein the plurality of data inputs includes a reference signal.

23. The apparatus of claim 22, wherein the reference signal comprises a chirp.

24. The apparatus of claim 22, wherein the modulator includes a sub-channeling component for sub-channeling the reference signal into the plurality of split data inputs.

25. The apparatus of claim 24, wherein the plurality of split data inputs comprise a plurality of parallel sub-channeled inputs.

26. The apparatus of claim 21, wherein each of the plurality of sub-channel modulators includes a time delay component.

27. The apparatus of claim 21, wherein each of the plurality of inputs includes a symbol data signal.

28. The apparatus of claim 27, wherein the symbol data signal varies for each of the plurality of inputs.

29. The apparatus of claim 27, wherein each of the plurality of sub-channel modulators includes a combining apparatus for combining one from, the plurality of split data inputs with the symbol data signal.

30. The apparatus of claim 29, wherein the combining apparatus comprises a switch.

31. The apparatus of claim 29, wherein the combining apparatus comprises on-off keying.

32. The apparatus of claim 29, wherein the combining apparatus comprises amplitude shift keying (ASK).

33. The apparatus of claim 21, wherein the demodulator includes:

a mixer for mixing the received complex composite waveform with a demodulator reference input to produce a frequency offset composite waveform.

34. The apparatus of claim 33, wherein the demodulator reference input comprises a time offset composite waveform.

35. The apparatus of claim 34, wherein the time offset composite waveform includes a chirp signal.

36. The apparatus of claim 34, wherein the chirp signal is un-modulated.

37. The apparatus of claim 33, wherein the demodulator reference input is generated at the demodulator.

38. The apparatus of claim 21, wherein each of the sub-channel demodulators includes a band pass filter.

39. The apparatus of claim 21, wherein each of the sub-channel demodulators includes an envelope detector.

40. A method for using offset chirp modulation for communication, the method comprising:

transmitting a reference chirp signal to a plurality of channels to produce a plurality of sub-carriers;

applying a varying time delay to each of the plurality of sub-carriers;

coding a symbol signal onto each of the plurality of subcarriers;

combining the plurality of subcarriers to produce a composite waveform;

transmitting the composite waveform;

receiving a composite waveform; and demodulating the received composite waveform into filtered symbol data.

41. A system for producing a modulation scheme for communication, comprising:

means for passing a reference chirp signal to a plurality of channels to produce a plurality of sub-carriers;

means for applying a varying time delay to each of the plurality of sub-carriers;

means for coding a symbol signal onto each of the plurality of subcarriers; and means for combining the plurality of subcarriers to produce a composite waveform.

* * * * *